United States Patent
Bionda et al.

(10) Patent No.: US 7,523,100 B1
(45) Date of Patent: Apr. 21, 2009

(54) METHOD AND APPARATUS FOR USING A RENDERED FORM AS A SEARCH TEMPLATE

(75) Inventors: Jon Bionda, Nepean (CA); William J. McGauley, Gloucester (CA)

(73) Assignee: Adobe Systems Incorporated, San Jose, CA (US)

( * ) Notice: Subject to any disclaimer, the term of this patent is extended or adjusted under 35 U.S.C. 154(b) by 347 days.

(21) Appl. No.: 11/069,509

(22) Filed: Feb. 28, 2005

(51) Int. Cl.
*G06F 7/00* (2006.01)
*G06F 17/30* (2006.01)

(52) U.S. Cl. .............................. 707/3; 707/6; 707/203; 715/221

(58) Field of Classification Search ............... 707/1–10, 707/100–104.1, 200–206; 715/513, 516, 715/210, 234, 221, 235; 717/170
See application file for complete search history.

(56) References Cited

U.S. PATENT DOCUMENTS

| | | | |
|---|---|---|---|
| 5,757,983 A | 5/1998 | Kawaguchi et al. | |
| 6,141,659 A * | 10/2000 | Barker et al. | 707/102 |
| 6,360,215 B1 | 3/2002 | Judd et al. | |
| 6,463,428 B1 * | 10/2002 | Lee et al. | 707/3 |
| 6,513,035 B1 | 1/2003 | Tanaka et al. | |
| 6,591,289 B1 | 7/2003 | Britton | |
| 6,665,666 B1 | 12/2003 | Brown et al. | |
| 6,687,689 B1 | 2/2004 | Fung et al. | |
| 6,694,328 B1 | 2/2004 | Bennett | |
| 7,080,073 B1 * | 7/2006 | Jiang et al. | 707/7 |
| 7,117,202 B1 * | 10/2006 | Willoughby | 707/3 |
| 2001/0003183 A1 | 6/2001 | Thompson et al. | |
| 2003/0188262 A1 | 10/2003 | Maxwell et al. | |
| 2004/0015778 A1 | 1/2004 | Britton et al. | |
| 2004/0039990 A1 | 2/2004 | Bakar et al. | |
| 2004/0243576 A1 | 12/2004 | Shrivastava et al. | |
| 2005/0004935 A1 | 1/2005 | Thede | |
| 2005/0010600 A1 | 1/2005 | Ciaramitaro et al. | |

OTHER PUBLICATIONS

Saiedian et al., A routing model for active form objects, Apr. 1994, ACM, 31-35.*
Saiedian et al., An operational model for intelligent forms in office automation, Feb. 1995, ACM, 415-419.*
"On developing a simple in-house digital library archive", Eric L. Brown, Luis G. Velaszco, G. Kirksey, S. Ramaswamy, M. Rogers, Proceedings of the 43rd annual southeast regional conference, vol. 1, ACM-SE 43 ACM Press.

* cited by examiner

*Primary Examiner*—Jean B Fleurantin
(74) *Attorney, Agent, or Firm*—Robert C. Kowert; Meyertons, Hood, Kivlin, Kowert & Goetzel, P.C.

(57) ABSTRACT

One embodiment of the present invention provides a system that uses a rendered form as a search template. During operation, the system obtains a form template for a form, wherein the form is not associated with predefined search fields. This form template includes presentation information specifying how the form is to be presented, and type information specifying data types for fields in the form. Next, the system uses the presentation information to generate a rendered form, and then allows an end-user to enter search criteria into fields in the rendered form. The system then generates a query based on the entered search criteria, and runs the query against a set of forms to identify forms matching the search criteria. Finally, the system generates a list of the matching forms.

20 Claims, 2 Drawing Sheets

METHOD AND APPARATUS FOR USING A RENDERED FORM AS A SEARCH TEMPLATE

BACKGROUND

1. Field of the Invention

The present invention relates to systems that support computer-based forms. More specifically, the present invention relates to a method and an apparatus that facilitates using a rendered form as a search template.

2. Related Art

Over a period of time, end-users of electronic forms typically submit an increasing amount of data that is archived in some type of back-end data store. For example, expense request forms and timesheet forms are often archived in this way. An end-user will periodically have to search for a specific form that they have previously submitted (e.g., to find the expense form for the trip to Norway).

In order to perform this search in an existing system, a system administrator is typically required to: (1) pre-define specific fields on the form as "searchable;" (2) assign a user-friendly name to each searchable field; and to (3) expose the searchable fields to the end-user in a generic search page. The user-friendly name is needed because the internal field names are typically not meaningful to end-users (e.g., "EXP_IT_DESC" might be the internal field name for the Expense form's Item Description field, but this internal field name may not mean anything to the end-user).

Hence, in an existing system, to invoke a search, the end-user: (1) selects the "friendly" field(s) of interest; (2) specifies a comparison type (=, >, starts-with, etc.); and finally (3) specifies a comparison value into an associated text box.

Note that the above-described process requires the system administrator to perform a significant amount of work to allow the end-user to search for a specific form field. Furthermore, this work has to be repeated for every form and every field that the end-user needs to search for. Moreover, during this entire process, there is no intuitive connection between the actual rendered form and the associated search. Consequently, the end-user has to properly associate fields on the generic search page with desired fields in the actual rendered form.

Hence, what is needed is a method an apparatus that facilitates searching for a form without the problems described above.

SUMMARY

One embodiment of the present invention provides a system that uses a rendered form as a search template. During operation, the system obtains a form template for a form, wherein the form is not associated with predefined search fields. This form template includes presentation information specifying how the form is to be presented, and type information specifying data types for fields in the form. Next, the system uses the presentation information to generate a rendered form, and then allows an end-user to enter search criteria into fields in the rendered form. The system then generates a query based on the entered search criteria, and runs the query against a set of forms to identify forms matching the search criteria. Finally, the system generates a list of the matching forms.

In a variation on this embodiment, using the presentation information to generate the rendered form involves using the type information to render the form in a manner that permits type-sensitive entry of search conditions for exposed fields in the rendered form.

In a further variation, generating the query involves using the type information for a given field to recognize type-specific search conditions entered into the given field.

In a further variation, allowing the end-user to enter the search criteria involves allowing the end-user to enter operators (including AND and OR) to refine the search.

In a variation on this embodiment, the previously submitted forms are stored in the repository using internal field names as keys, wherein the internal field names are not exposed to the end-user.

In a further variation, generating the query involves using the internal field names in the generated query.

In a variation on this embodiment, using the presentation information to generate the rendered form involves rendering the form to an HTML or an XML stream.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

System

Figure 1:
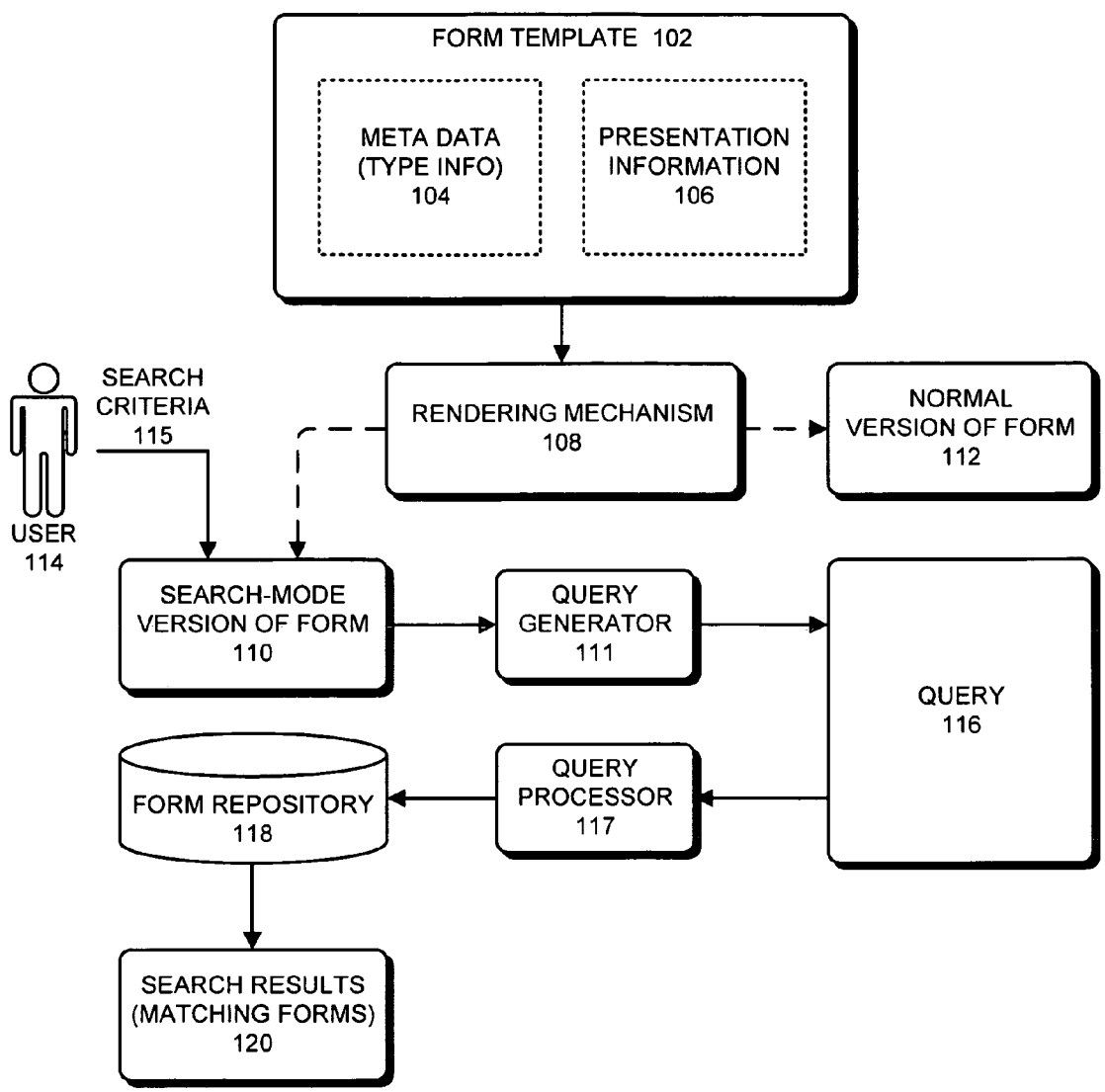
FIG. 1 illustrates a system that facilitates using a rendered form as a search template in accordance with an embodiment of the present invention.

FIG. 1 illustrates a system that facilitates using a rendered form as a search template in accordance with an embodiment of the present invention. This system operates within a computer system (not shown), which can generally include any type of centralized or distributed computer system. (Note that a form is a type of document which includes fields for accepting data values, wherein the data values can have pre-specified types, such as integer, character, etc.)

The system starts with a "form template" 102, which includes metadata 104 and presentation information 106 that is used to generate an instance of a form. Metadata 104 can include any type of information that specifies characteristics and associations between data items associated within the generated form. In one embodiment of the present invention, metadata 104 specifies type information for fields in the generated form. Presentation information 106 specifies how the generated form is to be presented to the end-user. This can include any information that specifies how the form and associated fields are to be presented to the end-user. For example, presentation information 106 can specify the geometrical layout of the rendered form, as well as colors graphical features that appear on the rendered form.

In addition, form template 102 can specify data values associated with the form, such as default values for fields in the form.

Form template 102 feeds through rendering mechanism 108, which uses presentation information 106 and metadata 104 to generate either a search-mode version of the form 110, or a normal version of the form 112. The normal version of the form 112 can accept data which is entered by user 114 into fields in the normal version of the form. In contrast, the search-mode version of the form 110 can accept type-sensitive search criteria 115 into fields in the form, wherein the search criteria can be used to automatically generate a query 116.

Query 116 can be run against a form repository 118 containing previously submitted forms (with values entered into the form fields) to produce search results 120, which identify forms that match the search criteria. Form repository 118 can generally include any data store that can be used to store forms. In one embodiment of the present invention, repository 118 is a database, which contains data associated with the previously submitted forms. In another embodiment, repository 118 is a portion of a file system (such as a directory), which contains the previously submitted forms.

This entire process is described in detail below with reference to the flow chart in FIG. 2.

Generating and Using a Rendered Form as a Search Template

In one embodiment of the present invention, when an end-user wants to search for one or more forms containing data that matches specified criteria, the end-user invokes the actual rendered form in a search mode. This enables the end-user to type search criteria directly into the fields of interest in the form. This means that no pre-definition of user-friendly names for fields is required and the system works transparently across forms that have been translated to other languages (presuming the internal field names are kept the same).

The invocation of the form in search mode causes a special search-mode rendering of the form to be generated, which permits a type-sensitive entry of search conditions for all exposed fields on the form. For example, in an expense report the "total" field is typically protected, but there may be a requirement to search for totals greater than x and less than y. The search-mode rendering can allow the field to be selected, and can possibly have some form of wizard that knows, for example, a given field is a numeric field and which can prompt for the condition associated with a numeric field. The same is true for a date field, except that instead of conditions such as "greater-than", "equal-to", or "less-than", the conditions can include, "before", "after" or "on". Text field conditions can include, "equals", "begins-with", "ends-with" and "contains". The search criteria can also include operators, such as "AND" or "OR" to refine the search.

Once all field conditions are specified, they are submitted to query generator 111, which generates query 116. Query 116 feeds into query processor 117, which searches form repository 118 and returns search results 120, which contains a list of previously submitted forms that match the search criteria.

Figure 2:
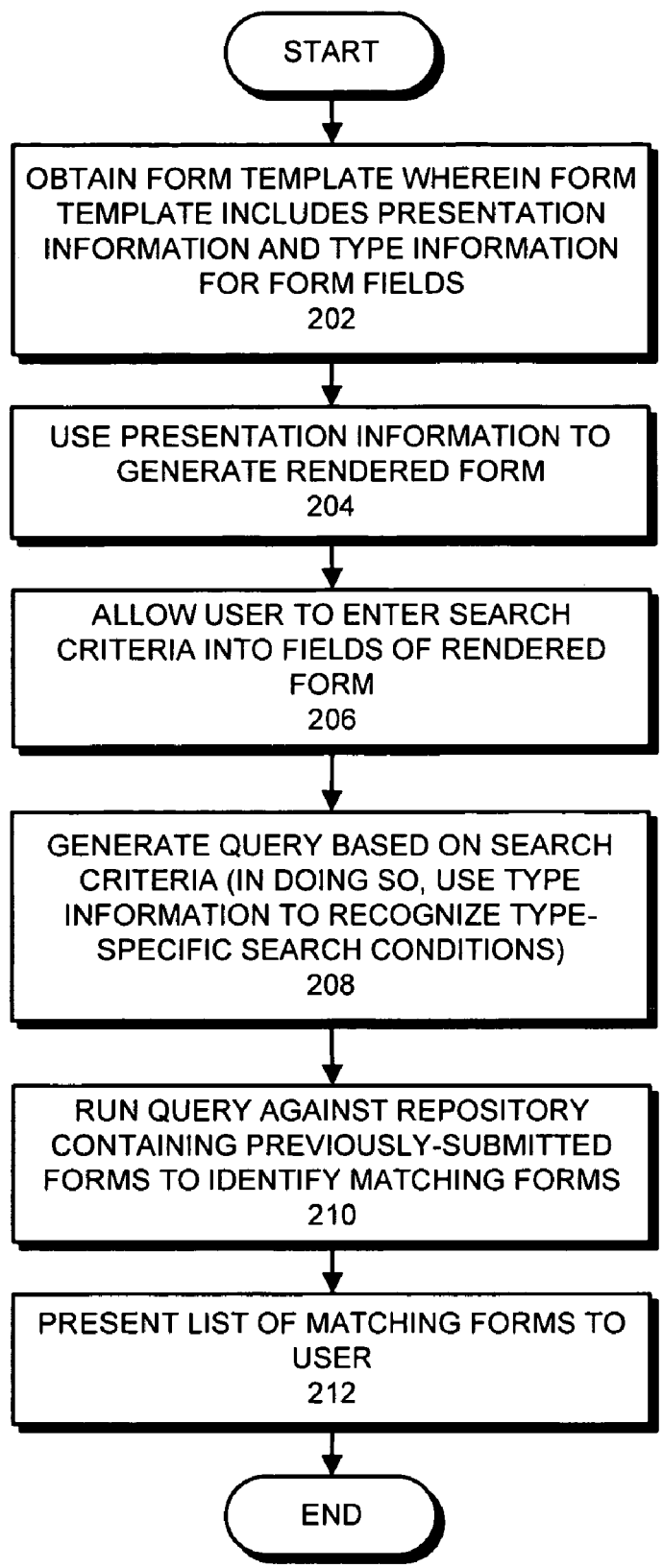
FIG. 2 presents a flow chart illustrating the process of generating and using a rendered form as a search template in accordance with an embodiment of the present invention.

More specifically, FIG. 2 presents a flow chart illustrating the process of generating and using a rendered form as a search template in accordance with an embodiment of the present invention. The system first obtains a form template 102 (step 202). For example, form template 102 can be selected by an end-user from a database containing a large number of form templates. As mentioned above, form template 102 includes presentation information specifying how the associated form is to be presented. It also includes type information specifying data types for fields in the form.

Next, the system uses the presentation information to generate a rendered form (step 204), and then presents the rendered form (with blank form fields) to the end-user. This allows the end-user to enter search criteria into the rendered form (step 206).

The system then generates a query based on the entered search criteria (step 208). In doing so, the system uses the type information associated with fields to recognize type-specific search conditions in the search criteria entered into each field in the rendered form.

Next, the system runs the query against repository 118, which contains previously submitted forms, to identify forms matching the search criteria (step 210). In one embodiment of the present invention, while storing the previously submitted forms, repository 118 uses internal field names (which are not exposed to the end-user) as keys. In this embodiment, the generated query also uses the internal field names. The end-user simply has to enter the search criteria into the relevant fields in the rendered from, and the associations with the internal field names will be made automatically, without the end-user having to worry about the internal field names.

Finally, the system presents a list of the matching forms to the end-user (step 212).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for using a rendered form as a search template, comprising:
    obtaining a form template for a form, wherein fields of the form are not predefined as to searchability, wherein the form template includes presentation information specifying how the form is to be presented, and type information specifying data types for fields in the form;
    using the presentation information to generate a rendered search-mode version of the form, rather than a normal version of the form;
    wherein the search-mode version of the form and the normal version of the form are both derived from the same form template;
    accepting search criteria in fields of the search-mode version of the form;
    generating a query based on the search criteria entered into fields of the rendered search-mode version of the form;
    running the query against a set of previously generated normal version form instances of the form to identify normal version form instances of the form matching the search criteria; and presenting a list of the normal version form instances of the form matching the search criteria to an end-user.

2. The method of claim 1, wherein said using the presentation information to generate the rendered search-mode version of the form comprises using the type information to render the search-mode version of the form in a manner that permits type-sensitive entry of search criteria for exposed fields in the rendered search-mode version of the form.

3. The method of claim 2, wherein said generating the query comprises using the type information for a given field to recognize type-specific search criteria entered into the given field.

4. The method of claim 1, wherein the search criteria entered into the search-mode version of the form comprises one or more of an AND operator and an OR operator to refine the search criteria.

5. The method of claim 1, wherein the previously generated version form instances are stored in a repository using internal field names as keys, wherein the internal field names are not exposed to the end-user.

6. The method of claim 5, wherein said generating the query comprises using the internal field names in the generated query.

7. The method of claim 1, wherein said using the presentation information to generate the rendered search-mode version of the form comprises generating the rendered search-mode version of the form in HTML or XML.

8. A computer-readable storage medium storing instructions that when executed by a computer cause the computer to perform a method for using a rendered form as a search template, the method comprising:
  obtaining a form template for a form, wherein fields of the form are not predefined as to searchability, wherein the form template includes presentation information specifying how the form is to be presented, and type information specifying data types for fields in the form;
  using the presentation information to generate a rendered search-mode version of the form, rather than a normal version of the form;
  wherein the search-mode version of the form and the normal version of the form are both derived from the same form template;
  accepting search criteria in fields of the search-mode version of the form;
  generating a query based on the search criteria entered into fields of the rendered search-mode version of the form;
  running the query against a set of previously generated normal version form instances of the form to identify normal version form instances of the form matching the search criteria; and
  generating a list of the normal version form instances of the form matching the search criteria.

9. The computer-readable storage medium of claim 8, wherein said using the presentation information to generate the rendered search-mode version of the form comprises using the type information to render the search-mode version of the form in a manner that permits type-sensitive entry of search criteria for exposed fields in the rendered search-mode version of the form.

10. The computer-readable storage medium of claim 9, wherein said generating the query comprises using the type information for a given field to recognize type-specific search criteria entered into the given field.

11. The computer-readable storage medium of claim 8, wherein the search criteria entered into the search-mode version of the form comprises one or more of an AND operator and an OR operator to refine the search criteria.

12. The computer-readable storage medium of claim 8, wherein the previously generated normal version forms are stored in a repository using internal field names as keys, wherein the internal field names are not exposed to end-users.

13. The computer-readable storage medium of claim 12, wherein said generating the query comprises using the internal field names in the generated query.

14. The computer-readable storage medium of claim 8, wherein said using the presentation information to generate the rendered search-mode version of the form comprises generating the rendered search-mode version of the form in HTML or XML.

15. A computer system, comprising:
  a processor; and
  a memory;
  wherein the memory comprises program instructions executable by the processor to implement:
  a retrieval mechanism configured to retrieve a form template for a form, wherein fields of the form are not predefined as to searchability, wherein the form template includes presentation information specifying how the form is to be presented, and type information specifying data types for fields in the form;
  a rendering mechanism configured to use the presentation information to generate a rendered search-mode version of the form, rather than a normal version of the form;
  wherein the search-mode version of the form and the normal version of the form are both derived from the same form template;
  a data-entry mechanism configured to allow an end-user to enter search criteria into fields in the rendered search-mode version of the form;
  a query generator configured to generate a query based on the entered search criteria; and
  a query processor configured to run the query against a set of previously generated normal form instances of the form to identify form instances of the form matching the search criteria.

16. The computer system of claim 15, wherein the rendering mechanism is configured to use the type information to render the form in a manner that permits type-sensitive entry of search criteria for exposed fields in the rendered search-mode version of the form.

17. The computer system of claim 16, wherein the rendering mechanism is configured to use the type information for a given field to recognize type-specific search criteria entered into the given field.

18. The computer system of claim 16, wherein the data-entry mechanism is configured to allow the end-user to enter one or more of an AND operator and an OR operator to refine the search criteria.

19. The computer system of claim 15, wherein the previously generated normal version forms are stored in a repository using internal field names as keys, wherein the internal field names are not exposed to the end-user.

20. The computer system of claim 19, wherein the query-generator is configured to use the internal field names in the generated query.

* * * * *